United States Patent [19]

Godwin

[11] Patent Number: 5,415,527
[45] Date of Patent: May 16, 1995

[54] PROPELLER ASSEMBLY

[75] Inventor: John H. Godwin, Winchcombe, United Kingdom

[73] Assignee: Dowty Aerospace Gloucester Limited, Gloucester, United Kingdom

[21] Appl. No.: 133,338

[22] Filed: Oct. 8, 1993

[30] Foreign Application Priority Data

Oct. 8, 1992 [GB] United Kingdom ............... 9221188

[51] Int. Cl.⁶ ............................................. B64C 11/06
[52] U.S. Cl. ............................ 416/205; 416/220 A; 416/209
[58] Field of Search ............... 416/147, 205, 207, 209, 416/219 A, 220 A, 221

[56] References Cited

U.S. PATENT DOCUMENTS

| | | | |
|---|---|---|---|
| 1,808,888 | 6/1931 | Fahlin ................................. | 416/207 |
| 1,875,606 | 9/1932 | Houston .............................. | 416/207 |
| 2,315,574 | 4/1943 | Anderson ........................... | 416/220 A |
| 2,425,938 | 8/1947 | Hoover ............................... | 416/205 |
| 2,499,837 | 3/1950 | Sheets et al. ...................... | 416/220 A |
| 2,652,123 | 9/1953 | Kearns, Jr. ......................... | 416/205 |
| 3,490,537 | 1/1970 | Quenneville ....................... | 416/205 |
| 5,118,256 | 6/1992 | Violette et al. .................... | 416/205 |

FOREIGN PATENT DOCUMENTS

| | | | |
|---|---|---|---|
| 838670 | 5/1952 | Germany ............................ | 416/221 |
| 598991 | 3/1948 | United Kingdom ................ | 416/209 |
| 2244525 | 12/1991 | United Kingdom ............. | 416/219 R |

*Primary Examiner*—Edward K. Look
*Assistant Examiner*—James A. Larson
*Attorney, Agent, or Firm*—Young & Thompson

[57] ABSTRACT

A propeller comprises a hub (1) rotatable about a propeller axis and formed with a hub barrel (1) with a central hub axis that extends radially of the propeller axis, a blade (9) having a support assembly (3) at its inner end received within the hub barrel (1) and including at least one bearing (11,16) that supports the blade (9) for rotation about the hub axis, a locking recess (7,25,33) formed at least in part in the support assembly (3) and at least in part in the hub barrel (1) and a key element (26) located within the locking recess (7,25,33) to restrain radial outwards movement of the blade (9) along the hub axis. The key element (26) is insertable into and retractable from the locking recess (7,25,33) while the inner end of the blade (9) is assembled in the hub barrel (1). The locking recess (7,25,33) extends circumferentially within the hub barrel (1), and the key element (26) is flexible to follow the recess when inserted. A threaded pre-loading ring (22) pre-loads the key element (26), and simultaneously pre-loads the bearings (11,16). The key element (26) and locking recess (7,25,33) are shaped to produce a wedging action when loading by the pre-loading ring (22).

24 Claims, 6 Drawing Sheets

PROPELLER ASSEMBLY

TECHNICAL FIELD

This invention relates to a propeller assembly comprising a hub and a plurality of blades retained therein.

BACKGROUND OF THE INVENTION

Such propellers are usually formed from a plurality of propeller blades each being located by a radially inner end, called a shank, in a barrel of a hub of the propeller. Conventionally, the hub is made in separable halves to allow insertion of bearings between races on the shank and races on the hub. These bearings permit rotation of the blade in the hub to vary the pitch of the propeller.

EP 0322344 discloses a one-piece hub arrangement in which the shank of a propeller blade is inserted into a barrel of the hub. Bearings are fed between the barrel and the shank until they are positioned between races provided by the shank and barrel. The bearings are pre-loaded by outwards movement of a race insert in threaded engagement with the hub barrel. Such a method is complicated and time consuming. Further, the use of threads in the hub barrel can lead to failure of the assembly.

The inner bearing of EP 0322344 also provides the means for retaining the blade within the hub by acting against an inner race provided by an inwardly extending portion of the barrel wall. This portion is integrally formed in order to avoid discontinuities.

SUMMARY OF THE INVENTION

According to the invention there is provided a method of retaining a propeller blade in a propeller hub comprising providing a hub having formed therein a hub barrel; providing a propeller blade and assembling about a radially inner end of the blade at least one bearing to form a blade assembly; inserting the inner end of the blade assembly into the hub barrel to form a recess between the hub barrel and blade assembly; and inserting key means into the recess to prevent radially outwards movement of the blade assembly.

By assembling the or each bearing onto the shank of the blade prior to insertion of the blade assembly, the assembly procedure is made simpler and quicker. The satisfactory alignment of these critical components is ensured since they can be readily inspected prior to insertion into the hub barrel. This method of assembly is facilitated by the use of a separate key means insertable into the recess to lock the blade assembly into the barrel.

According to a second aspect of the invention there is provided a propeller comprising a hub having formed therein a hub barrel; a blade assembly including at least one bearing about an inner end thereof; a recess defined at least in part by the blade assembly and the hub barrel; and key means located within the recess to prevent radially outwards movement of the blade assembly relative to the hub barrel.

Whilst the recess may be formed over a limited length of the circumference of the barrel, preferably the recess is an annular recess extending circumferentially about the blade assembly. This permits the recess to be conveniently formed by machining a circumferential groove in the internal surface of the hub barrel, and assists in the positive location of the blade.

Advantageously, the key means is pre-loaded into engagement with the blade assembly and the hub. This is advantageous because it prevents undesirable vibration movement of the blade assembly in the hub.

Preferably, the bearing or bearings are pre-loaded to reduce vibration. In the most preferred method both the bearings and the key means are pre-loaded. Conveniently, pre-loading means is provided to enable the bearing and key means to be loaded substantially simultaneously.

Whilst in some circumstances it may be sufficient to provide one recess and one key means, where greater security is required a plurality of recesses and key means may be used.

Conveniently, a hole is provided through a defining wall of the hub barrel and into the recess by means of which the key means is inserted into the recess.

The key means may comprise a flexible elongate member, the degree of flexibility being sufficient to enable the member to follow the recess. Whilst the key means may be formed as a single piece, in the preferred form it comprises a plurality of segments linked together by link means. The link means itself comprise an elongate, flexible member which in the described preferred embodiment comprises a wire passing centrally through the segments.

To prevent accidental retraction of the key means from the propeller under the action of vibration, preferably, it is locked to the hub. Preferably, an end portion of the key means is formed with a thread to engage a corresponding thread in the hole.

For greater ease of assembly, the barrel is provided with an internal shoulder against which the blade assembly abuts to prevent further radially inwards movement, and to align the hub and blade locking recesses to allow easy insertion of the segments.

BRIEF DESCRIPTION OF THE DRAWINGS

A specific embodiment of the invention will now be described, by way of example only, with reference to the drawings in which.

DETAILED DESCRIPTION OF THE INVENTION

Figure 1:
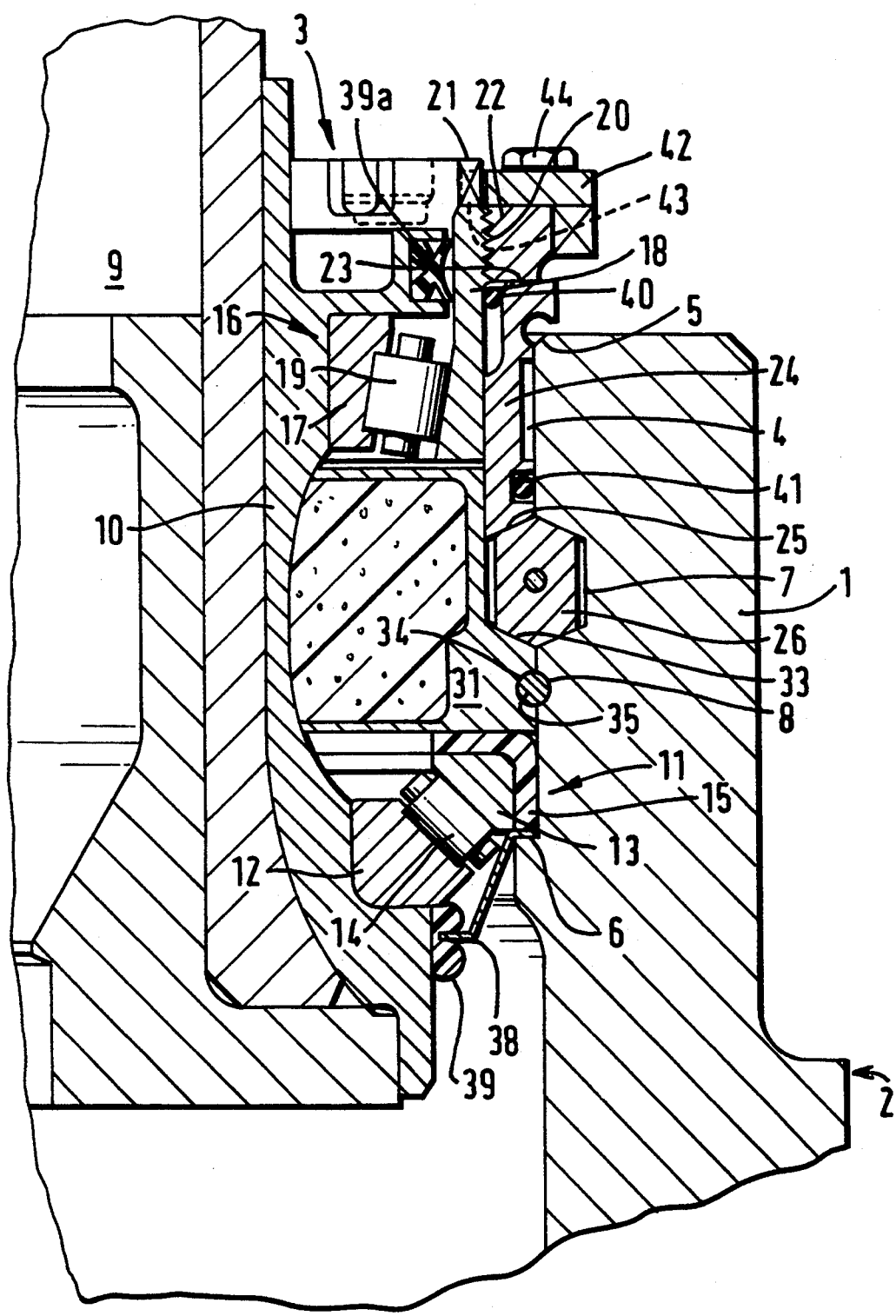
FIG. 1 shows an axial section through a barrel and blade assembly of a propeller arrangement in accordance with the invention.

With reference to FIG. 1, a propeller assembly in accordance with the invention comprises a hub barrel 1 formed in an aluminium propeller hub 2 and a blade assembly 3 located and retained therein.

The hub barrel 1 has a generally cylindrical form defined by an inner surface 4 extending radially towards the axis of rotation of the propeller. The inner surface 4 is bevelled at its outermost portion 5 to aid insertion of the blade assembly 3. At the radially inner end of the bore, the surface 4 has formed therein a shoulder 6. Approximately half-way between the bevelled outermost portion 5 and the shoulder 6 is formed a channel 7 which extends circumferentially about the bore. Radially inwards from the channel 7 is formed a half circular groove 8 which also extends circumferentially about the bore at a constant distance from the channel 7.

The blade assembly comprises a carbon fibre composite blade 9, the root or shank 10 of which is formed from an annular steel sleeve. Located about a radially inner end of the shank 10 is the inner bearing 11. The inner bearing comprises a first race 12 and a second race 13 between which are located a plurality of roller elements 14. About the second race 13 is clipped a plastics material anti-fret liner 15.

An outer bearing 16 is located about the radially outermost end portion of the shank 10. The bearing 16 is formed from a split third race 17 clipped about the shank 10, a corresponding fourth race 18 and a plurality of cylindrical roller elements 19 running between the races.

The fourth race 18 is generally cylindrical in shape having formed on its outer surface (with respect to the longitudinal blade axis) at its radially outermost end portion, a screw thread 20. A series of dog formations 21 are provided at regular intervals about the peripheral edge of the fourth race 18.

A pre-load ring 22 is in threaded engagement with the fourth race 18 and its radially innermost face 23 abuts with a pre-load collar 24. The pre-load collar 24 extends coaxially with the blade shank 10 and its radially innermost ramp-like edge 25 abuts with a key element 26. A locking ring 42 provided with a series of lugs 43 distributed about its inner periphery for registration with the dogs 21 formed in the fourth race 18 is bolted to the pre-load ring 22 by bolts 44.

Figure 2:
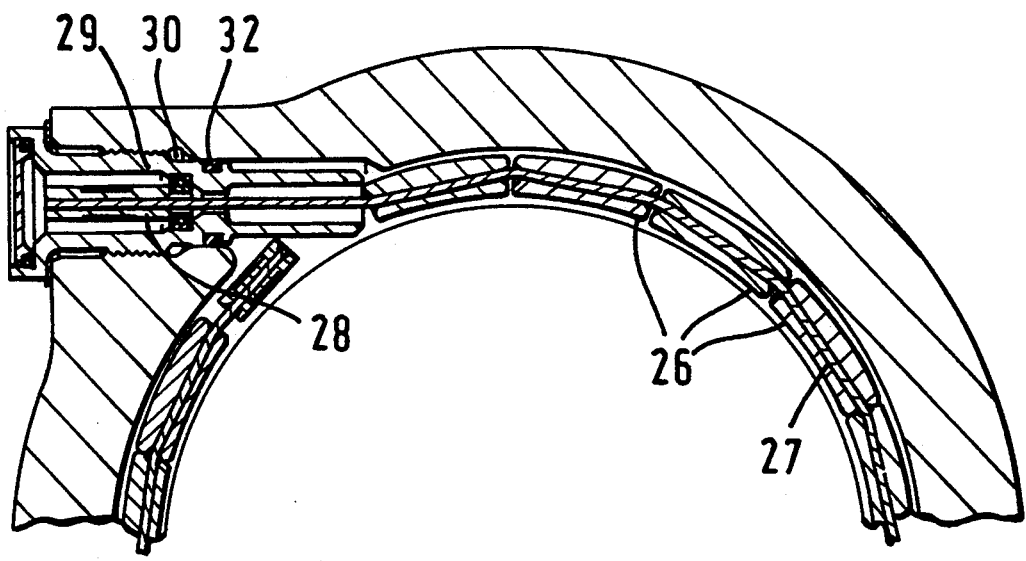
FIGS. 2 and 3 show cross-sections through part of the barrel and blade assembly shown in FIG. 1.

The key element 26 has two major faces and four minor faces when viewed in cross-section as shown in FIG. 1. FIG. 2 shows that there are a plurality of key elements linked together by a steel wire tether 27 which is generally arcuate in shape. The tether 27 is fixed by a swivel arrangement 28 to a bolt 29 in threaded engagement with a hole 30 passing through the barrel wall into a recess defined by channel 7, ramp-like edge 25 and a spacer 31. An 'O' ring 32 provides a seal between the barrel wall and the bolt 29.

Spacer 31 is a shell-like structure backed by foamed plastics material and is located between, and holds apart, the bearings. It provides two recess defining walls, the radially innermost one of which provides an inclined ramp-like surface 33. The spacer 31 is also provided with a semi-circular groove 34 to form with grove 8 a secondary recess. Within this recess is located a back-up key wire 35.

Figure 3:
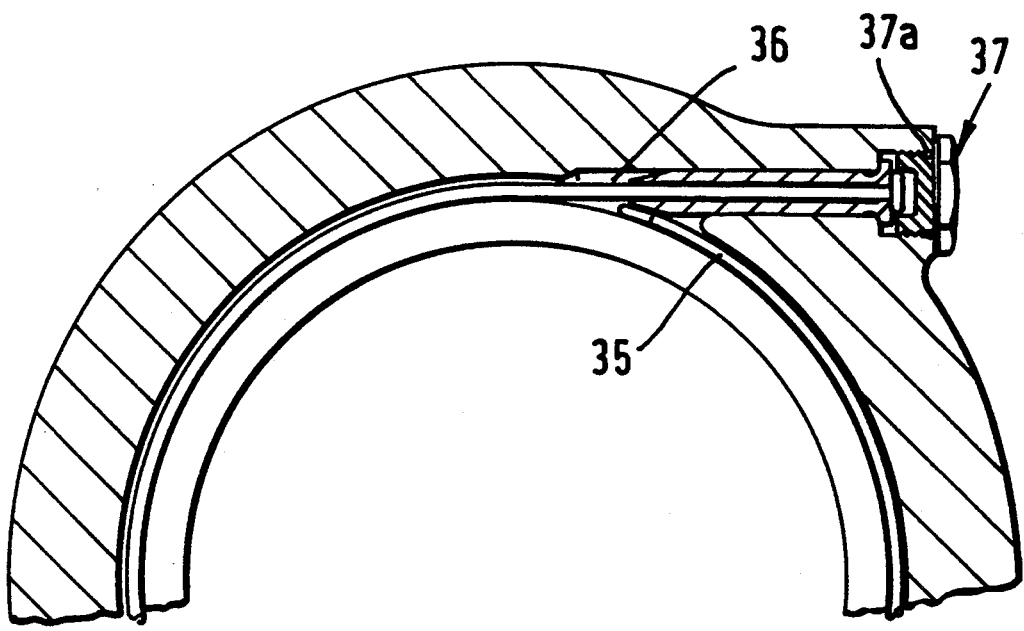
Figure 4:
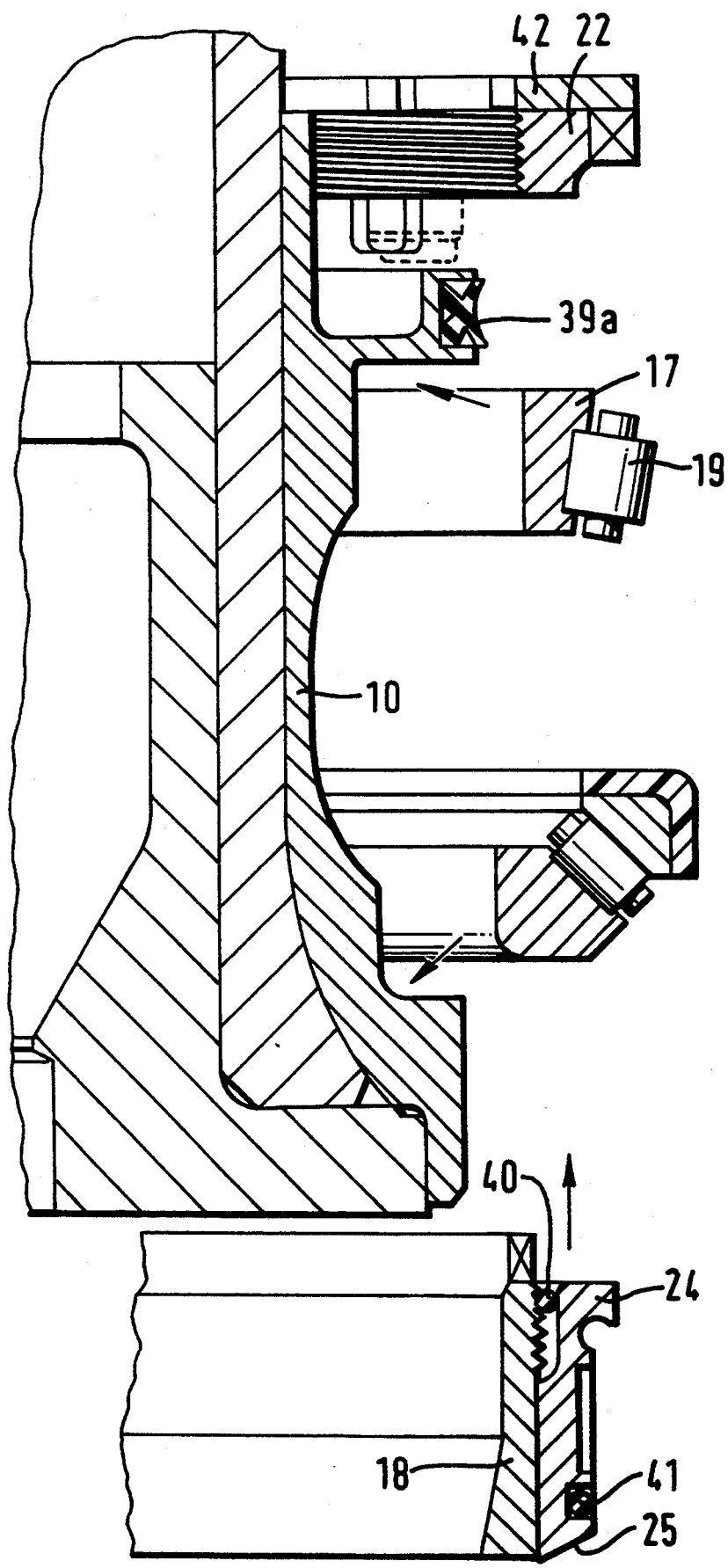
FIGS. 4 to 7 illustrate the method of assembly of a propeller arrangement in accordance with the invention.
Figure 5:
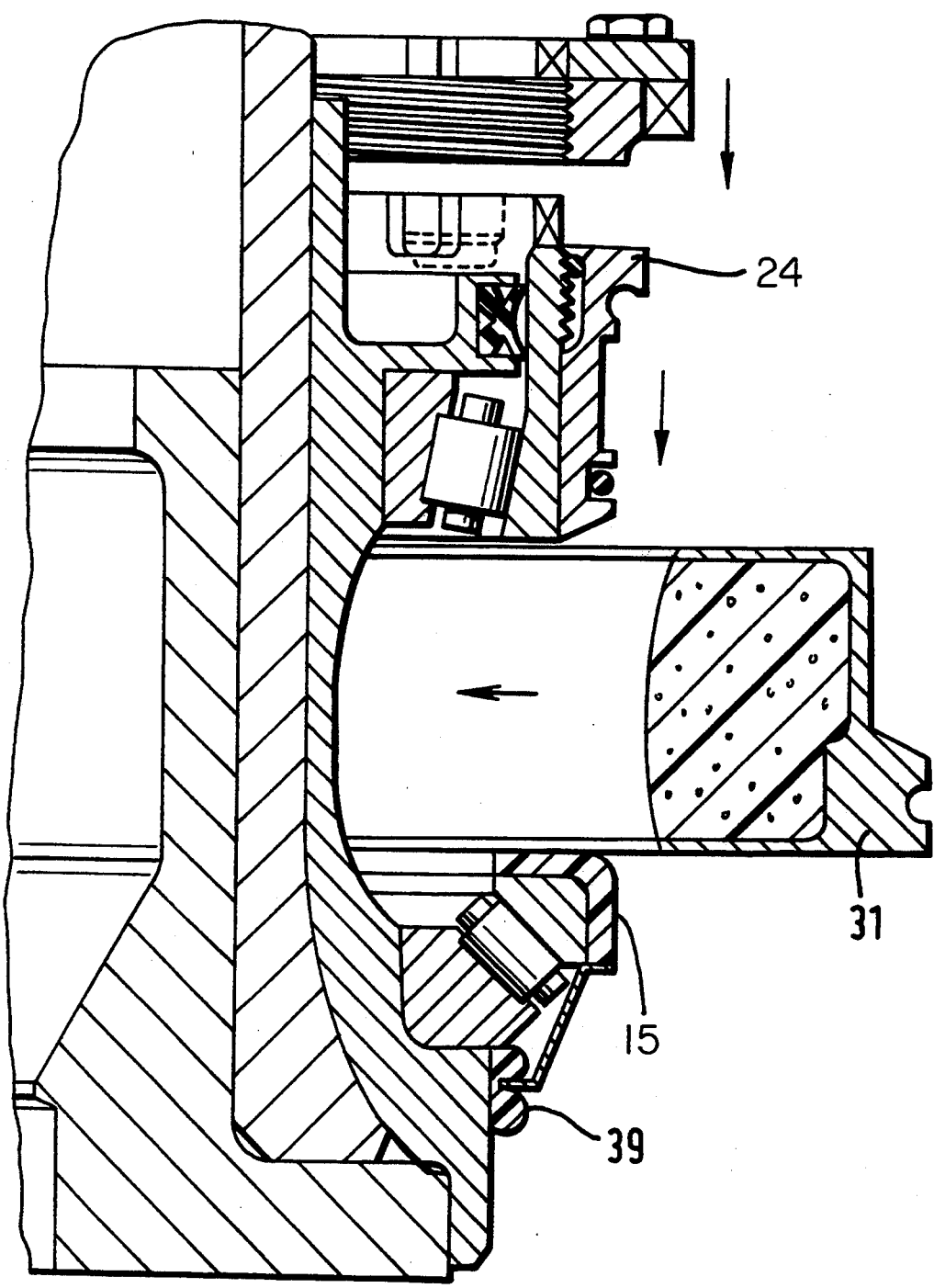

As more clearly shown in FIG. 3, the key wire 35 passes through a hole 36 formed through the hub barrel wall and into the secondary recess. The key wire 35 is retained by a bolt 37 in threaded engagement with the hole 36 and an 'O' ring 37a provides a seal.

A conical metal annulus 38 extends between the shoulder 6 and a ring seal 39 to which it is attached. The ring seal 39 sealingly engages with an end portion of the shank 10. This together with elastomeric seals 39, 40 and 41 prevent leakage of lubricant from the bearings or the ingress of dirt or other contaminants.

The propeller is assembled in the following manner. Seal 39a is passed over the radially innermost end of the shank and located within the seal recess. Pre-load ring 22 is passed over the shank 10 and onto the blade together with the locking ring 42. The split race 17 is clipped about the upper portion of the shank 10 and the rolling elements 19 assembled in cages about the race 17. Next the pre-load mechanism comprising fourth race 18, pre-load collar 24 and sealing rings 40 and 41 is slid over and radially along the shank 10 until the lower ramp face is level or just above the radially innermost portion of the bearing elements 19. The lower bearing 11 and anti-fret liner 15 are then clipped into place about the radially innermost portion of the shank 10.

Figure 6:
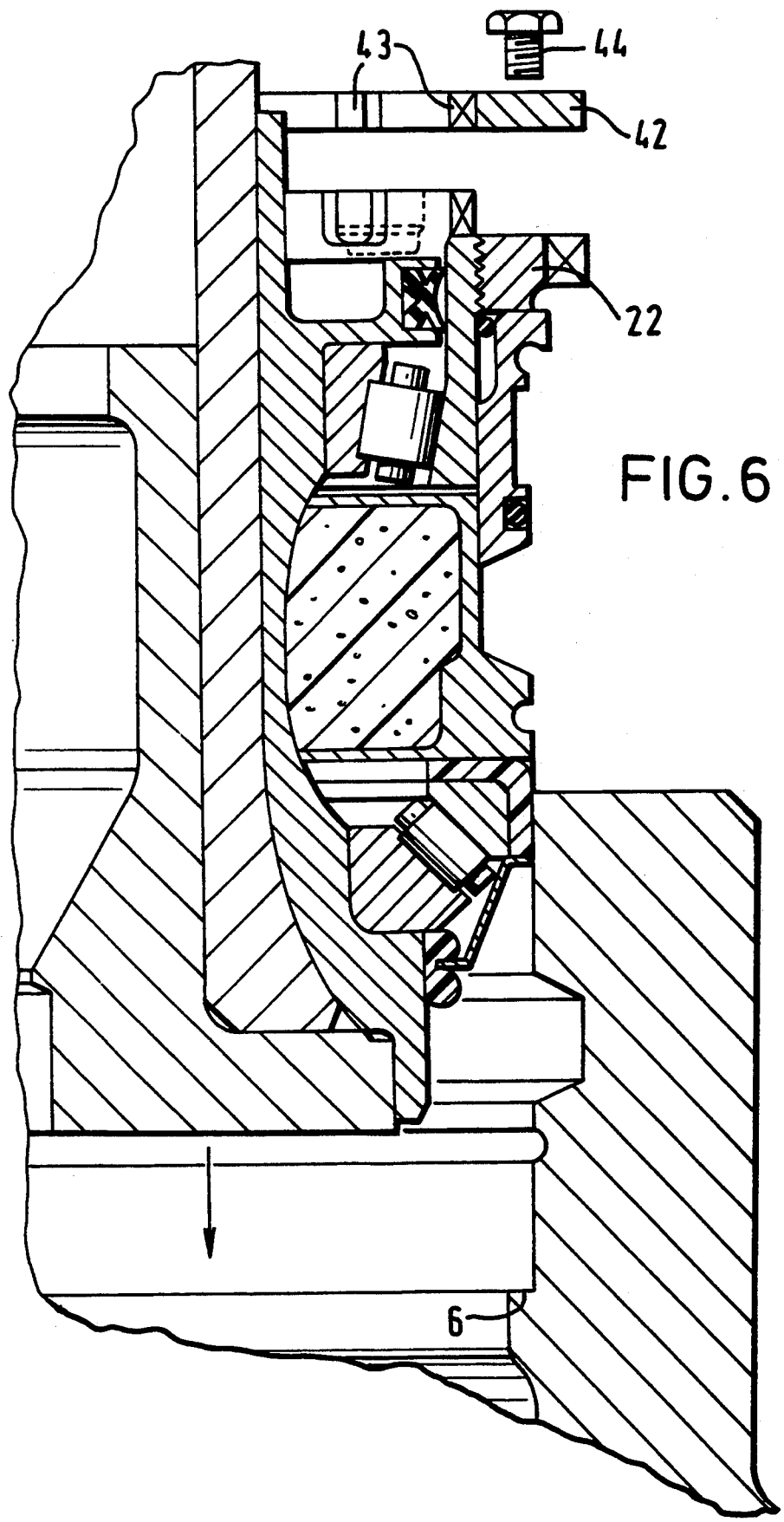

The spacer 31 with its foam backing is provided as a split component and clipped between the bearings holding them apart and against abutments formed on the shank 10. The conical annulus 38 and seal 39 are slid over the innermost end of the shank 10. This component is retained in place by the resilience of the seal 39 and the interference fit between it and the shank 10. With the spacer 31 in position, the collar 22 is slid radially inwards to retain it in place. This exposes the threaded portion 20 of the fourth race 18 and the pre-load ring 22 is brought radially inwards to engage the threads. The blade assembly is then complete as shown in FIG. 6.

Figure 7:
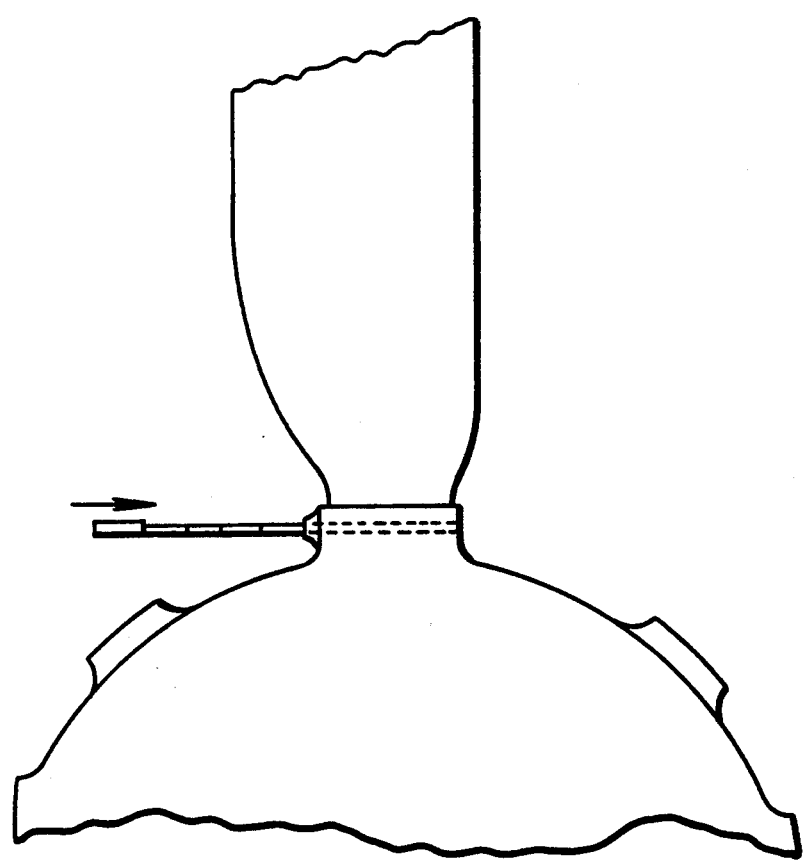

The propeller hub will be provided with a plurality of hub barrels but each blade assembly will be loaded into its respective barrel in an identical manner. The first stage is to introduce the radially innermost end of the blade assembly into the barrel, as shown in FIG. 6, until a flanged portion of the conical annulus 38 abuts with shoulder 6. The key segments 26 and key wire 35 are then introduced into their respect recesses via respective holes in the hub as shown in FIG. 7. When fully inserted, they are locked into place by rotating their respective bolts.

The next operation is to pre-load the bearings and the key segments 26. Both pre-loads are applied simultaneously by applying 'C' spanners to the dogs of the fourth race 18 and the pre-load 22 to cause relative rotation therebetween. This drives the fourth race 18 radially outwards loading the bearing element 19 against race 17 and race 12 against element 14 and race 13. The pre-load ring 22 is driven radially inwards with its face 23 abutting and forcing collar 24 before. The lower surface 25 of the collar 24 abuts against the inclined surface of the key segment 7 loading it against the hub barrel 1 in conjunction with the inclined surface 33 of the spacer 31.

The annular locking ring 42 is then slid radially inwards until its lugs 43 engage the dog formations on the fourth race 18. Bolts 44 are then passed through holes in the locking ring 42 to engage threaded holes formed in the pre-load ring 22. The locking ring 42 thus prevents relative movement of the fourth race 18 and the pre-load ring 22.

The blade assembly is removed by the reverse of the above described procedure.

I claim:

1. A propeller comprising a hub rotatable about a propeller axis and formed with a hub barrel with a central hub axis that extends radially of the propeller axis, a blade having a support assembly at its inner end received within the hub barrel and including at least one bearing that supports the blade for rotation about the hub axis, a locking recess formed at least in part in the support assembly and at least in part in the hub barrel, and key means located within the locking recess to restrain radial outwards movement of the blade along the hub axis, said key means being insertable into and retractable from the locking recess while the inner end of the blade is assembled in the hub barrel, in which said locking recess comprises a recess extending circumferentially about the inner end of the blade, and in which the key means comprises a flexible elongate member which when inserted into the locking recess flexes to follow the circumferential shape of the recess.

2. A propeller as claimed in claim 1 in which the hub barrel is provided with an internal shoulder against which the support assembly abuts to prevent further radially inwards movement, and to align said hub and said locking recess.

3. A propeller as claimed in claim 1 in which the key means comprises a plurality of key segments joined together in a line by flexible link means so as to follow the circumferential shape of the locking recess when inserted therein.

4. A propeller as claimed in claim 3 in which the flexible link means comprises a flexible elongate member which cooperates with each key segment.

5. A propeller as claimed in claim 4 in which the flexible elongate member passes centrally through a hole in each key segment.

6. A propeller as claimed in claim 1 in which the key means is insertable into the locking recess through a hole in the hub barrel.

7. A propeller as claimed in claim 1 in which locking means is provided to lock the key means in the locking recess.

8. A propeller as claimed in claim 7 in which the locking means comprises a threaded connection between an end portion of the key means and the hub barrel.

9. A propeller as claimed in claim 1 in which a second locking recess is formed at least in part in the support assembly and at least in part in the hub barrel, and a second key means is located within the second locking recess to restrain radial outwards movement of the blade along the hub axis, said second key means being insertable into and retractable from the second locking recess while the inner end of the blade is assembled in the hub barrel.

10. A propeller as claimed in claim 9 in which said second locking recess comprises a recess extending circumferentially about the inner end of the blade and spaced along the hub axis from the other locking recess.

11. A propeller as claimed in claim 10 in which the second key means comprises a flexible elongate member which when inserted into the second locking recess, flexes to follow the circumferential shape of the recess.

12. A propeller as claimed in claim 1 including pre-loading means that pre-loads the key means radially into engagement with the support assembly and hub barrel.

13. A propeller as claimed in claim 12 in which the pre-loading means comprises a threaded ring coaxial with the hub barrel, and accessible from outside of the hub barrel so as to be tightenable radially to apply a pre-load to the key means.

14. A propeller as claimed in claim 13 in which the pre-loading means includes a sleeve within the hub barrel through which the threaded ring acts on the key means.

15. A propeller as claimed in claim 13 in which one of said parts of the locking recess is formed by two relatively moveable shoulders that are urged together by the threaded ring to load the key means therebetween.

16. A propeller as claimed in claim 15 in which the cooperating surfaces of said shoulders and key means are shaped so that there is a wedging action therebetween as the shoulders move together, thereby urging the key means laterally of the hub axis into engagement with the other of said parts of the locking recess.

17. A propeller as claimed in claim 16 in which the cooperating surfaces of the key means and the other of said parts of the locking recess in the hub barrel are shaped so that there is a wedging action therebetween as they move together laterally of the hub axis thereby more positively restraining the blade along the hub axis.

18. A propeller as claimed in claim 17 in which the key means has a substantially hexagonal cross-section in a plane through the hub axis.

19. A propeller as claimed in claim 13 in which the threaded ring is threaded on the support assembly and acts on the key means to pre-load it by urging it laterally outwards of the hub axis.

20. A propeller as claimed in claim 12 in which said pre-loading means pre-loads the bearing radially simultaneously when pre-loading the key means.

21. A propeller as claimed in claim 14 in which the threaded ring reacts against a part of the support assembly connected to a first bearing race which is located radially on one side of said at least one bearing, and applies a radial pre-load to that part of the support assembly which incorporates the key means and said part of the support assembly being connected to a second bearing race located radially on the opposite side of said at least one bearing from the first bearing race so that the pre-load is transmitted through said at least one bearing.

22. A propeller as claimed in claim 21 which comprises two of said bearings which are pre-loaded by the pre-loading means, respective bearing races of each bearing being connected radially relative to one another, and said first bearing race and said second bearing race of each bearing being radially moveable relative to one another, the threaded ring cooperating with a thread associated with one of the second bearing races and acting radially through the key means to apply a pre-load between the second bearing races.

23. A propeller as claimed in claim 1 which includes pre-loading means to pre-load the bearing.

24. A method of retaining a propeller blade in a propeller hub rotatable about a propeller axis comprising the steps of providing the hub having a hub barrel with a central hub axis that extends radially of the propeller axis; providing the propeller blade and assembling about a radially inner end of the blade at least one bearing to form part of a support assembly; inserting the support assembly into the hub barrel so that the blade is supported by the bearing to rotate within the hub barrel about the hub axis; providing a part recess in each of adjacent portions of the support assembly and the hub barrel so that these part recesses cooperate to form a locking recess when the inner end of the support assembly is inserted into the hub barrel, in which the locking recess comprises a recess extending circumferentially about the inner end of the blade; and inserting key means into the locking recess to prevent radially outwards movement of the blade along the hub axis, the key means comprising a flexible elongate member which when inserted into the locking recess flexes to follow the circumferential shape of the recess.

* * * * *